US009489305B2

(12) United States Patent
Patsilaras et al.

(10) Patent No.: US 9,489,305 B2
(45) Date of Patent: Nov. 8, 2016

(54) SYSTEM AND METHOD FOR MANAGING BANDWIDTH AND POWER CONSUMPTION THROUGH DATA FILTERING

(71) Applicant: QUALCOMM INCORPORATED, San Diego, CA (US)

(72) Inventors: George Patsilaras, San Diego, CA (US); Bohuslav Rychlik, Del Mar, CA (US); Andrew Edmund Turner, San Diego, CA (US); Kris Tiri, San Diego, CA (US); Jeong-Ho Woo, San Diego, CA (US); Anwar Rohillah, San Diego, CA (US); Feng Wang, San Diego, CA (US); Moinul Khan, San Diego, CA (US); Subbarao Palacharla, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 46 days.

(21) Appl. No.: 14/571,876

(22) Filed: Dec. 16, 2014

(65) Prior Publication Data

US 2016/0170877 A1    Jun. 16, 2016

(51) Int. Cl.
G06F 12/00 (2006.01)
G06F 12/08 (2016.01)
G06F 1/32 (2006.01)
G06F 13/16 (2006.01)
G06F 9/46 (2006.01)

(52) U.S. Cl.
CPC ......... *G06F 12/0802* (2013.01); *G06F 1/3253* (2013.01); *G06F 9/467* (2013.01); *G06F 12/0835* (2013.01); *G06F 12/0891* (2013.01); *G06F 13/16* (2013.01); *G06F 12/0804* (2013.01); *G06F 2212/604* (2013.01)

(58) Field of Classification Search
CPC .. G06F 12/0802; G06F 1/3253; G06F 9/467; G06F 13/16; G06F 2212/604
See application file for complete search history.

(56) References Cited

U.S. PATENT DOCUMENTS

| | | | |
|---|---|---|---|
| 6,910,107 B1 * | 6/2005 | Boucher ................. | G06F 12/08 711/117 |
| 7,366,847 B2 | 4/2008 | Kruckemyer et al. | |
| 8,015,365 B2 | 9/2011 | Kurts et al. | |
| 8,539,164 B2 | 9/2013 | Warner et al. | |
| 2005/0273563 A1 * | 12/2005 | Kim ....................... | G06F 12/127 711/143 |
| 2006/0026360 A1 * | 2/2006 | Morris ................ | G06F 12/0891 711/133 |
| 2008/0022064 A1 * | 1/2008 | Kenkare ............. | G06F 12/0855 711/169 |
| 2010/0241812 A1 * | 9/2010 | Bekoou ................... | G06F 9/526 711/141 |
| 2010/0325367 A1 | 12/2010 | Kornegay et al. | |
| 2013/0318308 A1 * | 11/2013 | Jayasimha .......... | G06F 12/0833 711/146 |
| 2014/0143505 A1 | 5/2014 | Sim et al. | |
| 2014/0223096 A1 * | 8/2014 | Zhe Yang ........... | G06F 12/0871 711/114 |

OTHER PUBLICATIONS

International Search Report and Written Opinion—PCT/US2015/064721—ISA/EPO—Feb. 19, 2016.

* cited by examiner

*Primary Examiner* — Shawn X Gu
(74) *Attorney, Agent, or Firm* — Smith Tempel (57) ABSTRACT

Various embodiments of methods and systems for managing write transaction volume from a master component to a long term memory component in a system on a chip ("SoC") are disclosed. Because power consumption and bus bandwidth are unnecessarily consumed when ephemeral data is written back to long term memory (such as a double data rate "DDR" memory) from a closely coupled memory component (such as a low level cache "LLC" memory) of a data generating master component, embodiments of the solutions seek to identify write transactions that contain ephemeral data and prevent the ephemeral data from being written to DDR.

27 Claims, 5 Drawing Sheets

SYSTEM AND METHOD FOR MANAGING BANDWIDTH AND POWER CONSUMPTION THROUGH DATA FILTERING

DESCRIPTION OF THE RELATED ART

Portable computing devices ("PCDs") are becoming necessities for people on personal and professional levels. These devices may include cellular telephones, portable digital assistants ("PDAs"), portable game consoles, palmtop computers, and other portable electronic devices. PCDs commonly contain integrated circuits, or systems on a chip ("SoC"), that include numerous components designed to work together to deliver functionality to a user. For example, a SoC may contain any number of master components such as modems, displays, central processing units ("CPUs"), graphical processing units ("GPUs"), etc. that read and/or write data and/or instructions to and/or from memory components on the SoC. The data and instructions may be generally termed "transactions" and are transmitted between the devices via a collection of wires known as a bus.

Notably, some data generated by a master component may be ephemeral in that it becomes obsolete or unneeded in a very short amount of time after being produced by a master component. Ephemeral data may exist in a closely coupled memory to its master component, such as a low level cache ("LLC"), before being written back to a long term memory device such as a double data rate ("DDR") memory. Writing ephemeral data back to DDR, however, unnecessarily consumes power and valuable bandwidth on the bus that would be better allocated to other transactions.

By declining to write ephemeral data generated by master components back to a DDR memory, power may be conserved and latencies of other transactions may be improved via better optimization of bandwidth allocation. Moreover, other quality of service ("QoS") metrics may also be optimized. Therefore, there is a need in the art for a system and method that identifies ephemeral data and filters it from being written back to long term memory.

SUMMARY OF THE DISCLOSURE

Various embodiments of methods and systems for managing write transaction volume from a master component to a long term memory component in a system on a chip ("SoC") are disclosed. Because power consumption and bus bandwidth are unnecessarily consumed when ephemeral data is written back to long term memory (such as a double data rate "DDR" memory) from a closely coupled memory component (such as a low level cache "LLC" memory) of a data generating master component, embodiments of the solutions seek to identify write transactions that contain ephemeral data and prevent the ephemeral data from being written to DDR.

One exemplary writeback data filter ("WDF") method comprises monitoring transactions of one or more master components that are associated with a closely coupled memory component(s). The monitored transactions are filtered to identify the transactions with ephemeral data content. Subsequently, the identified transactions with ephemeral data content are prevented from being written back from the closely coupled memory component to a long term memory component. Advantageously, by preventing the ephemeral data from being flushed back to the long term memory component, bus bandwidth and power consumption is not wasted.

Depending on WDF embodiment, the transactions may be filtered either upstream, downstream or both upstream and downstream of a closely coupled memory component. Further depending on WDF embodiment, the transactions may be filtered based on any one or more of, inter alia, identification ("ID") of a master component that generated a transaction, recognition of a memory address associated with a transaction, and an access mode associated with a transaction. Once identified, the ephemeral data may be prevented from being written back to the long term memory by clearing a dirty bit associated with the transaction that contains the ephemeral data. Also, the ephemeral data may be prevented from being written back to the long term memory by dropping the transaction that contains the ephemeral data upon its being evicted from the closely coupled memory.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

DETAILED DESCRIPTION

The word "exemplary" is used herein to mean serving as an example, instance, or illustration. Any aspect described herein as "exemplary" is not necessarily to be construed as exclusive, preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

In this description, reference to double data rate "DDR" memory components will be understood to envision any of a broader class of volatile random access memory ("RAM") used for long term data storage and will not limit the scope of the solutions disclosed herein to a specific type or generation of RAM. Similarly, it will be understood that various embodiments of the systems and methods provide a solution for filtering ephemeral data associated with a closely coupled memory component (e.g., a low level cache "LLC") such that the ephemeral data is not written back to a DDR memory component and, as such, the solutions envisioned herein are not limited in application to any particular type of LLC.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "central processing unit ("CPU")," "digital signal processor ("DSP")," "graphical processing unit ("GPU")," and "chip" are used interchangeably. Moreover, a CPU, DSP, GPU or a chip may be comprised of one or more distinct processing components generally referred to herein as "core(s)."

In this description, the terms "engine," "processing engine," "master processing engine," "master component" and the like are used to refer to any component within a system on a chip ("SoC") that utilizes a closely coupled memory component, such as an LLC component, for short term storage of data including ephemeral data. As such, a master component may refer to, but is not limited to refer to, a CPU, DSP, GPU, modem, controller, display, camera, etc.

In this description, the term "ephemeral data" refers to data that are produced by a master component in an LLC and consumed in a very short period of time, after which the data is no longer needed. Notably, writing ephemeral data back to a DDR memory may be a waste of power and valuable bandwidth on a bus and, as such, embodiments of the solution may seek to avoid writeback of ephemeral data.

In this description, the term "writeback" refers to the process of updating data and/or instructions instantiated in a DDR based on fresher versions of the data and/or instructions that exist in a LLC associated with one or more master components. One of ordinary skill in the art will understand data instantiated in an LLC may have a virtual memory address associated with a memory address in DDR. Based on the virtual memory address and the presence of a "dirty" bit for data stored in an LLC, a memory controller may seek to update DDR, as would be understood by one of ordinary skill in the art. The term "dirty bit" will be understood to be a bit associated with a virtual memory page in an LLC that indicates that the data stored in the memory page has been generated anew or modified from its original state by a master component, but not yet written back to DDR.

In this description, the term "bus" refers to a collection of wires through which data is transmitted from a processing engine to a memory component or other device located on or off the SoC. It will be understood that a bus consists of two parts—an address bus and a data bus where the data bus transfers actual data and the address bus transfers information specifying location of the data in a memory component. The term "width" or "bus width" or "bandwidth" refers to an amount of data, i.e. a "chunk size," that may be transmitted per cycle through a given bus. For example, a 16-byte bus may transmit 16 bytes of data at a time, whereas 32-byte bus may transmit 32 bytes of data per cycle. Moreover, "bus speed" refers to the number of times a chunk of data may be transmitted through a given bus each second. Similarly, a "bus cycle" or "cycle" refers to transmission of one chunk of data through a given bus.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") and fourth generation ("4G") wireless technology have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, a laptop computer with a wireless connection, among others.

In current systems and methods, master components running simultaneously in a PCD create an intermingled flow of read and write transaction requests that necessitate access to dispersed regions of a DDR memory component. Each transaction consumes power and bus bandwidth as data is transmitted over a bus and marshaled by a memory controller to and from a DDR component. Consequently, the writeback of ephemeral data to DDR may be an unnecessary consumption of power and utilization of bandwidth. Similarly, and as one of ordinary skill in the art would understand, the quality of service ("QoS") experienced by a user of a PCD may suffer when excessive amounts of bandwidth and power capacity are utilized to writeback data from an LLC to a DDR. The overutilization of the bandwidth to writeback may cause thrashing within the PCD as the application-level processing of other master components goes underserviced by the bus. Consequently, the writeback of ephemeral data to DDR may increase the probability of thrashing.

Embodiments of systems and methods for writeback data filtering ("WDF") may optimize power consumption and bus bandwidth utilization by reducing the amount of data that is written back to DDR memory from LLCs associated with certain master components. WDF embodiments reduce the amount of data that is written back to DDR by filtering ephemeral data of the LLCs based on memory address ranges, master component identification ("ID"), and/or access mode. For example, an exemplary WDF embodiment may filter any request generated by a display component, as the data used by the display is no longer needed once rendered. As another example, an exemplary WDF embodiment may leverage a predetermined data structure that specifies certain address ranges that are reserved for ephemeral data; any data associated with an address in the ranges may be filtered from a writeback queue.

It is envisioned that certain WDF systems may contain multiple master components associated with various last level caches ("LLC"). Data generated by the master components, which may include ephemeral data, may be temporarily stored in the LLCs. Depending on the embodiment, a WDF module may be positioned upstream (i.e., "pre-cache") or downstream (i.e., "post-cache") of the LLCs and configured to identify and filter out ephemeral data from being written back to DDR. Advantageously, by excluding ephemeral data from writeback, the probability of thrashing to the detriment of other master components may be mitigated so that the QoS provided by the PCD does not suffer. Also, because power and bus bandwidth is not consumed unnecessarily to writeback obsolete or junk data to the DDR, the latency for application-level processing and transactions that do require writeback may be improved.

In an exemplary use case, a WDF embodiment may recognize and filter out temporal data associated with a GPU device driver. In another exemplary use case, a rotator may be generating data and writing it to an LLC. Once a display component reads the data, the data is no longer needed. Leveraging this fact, an exemplary WDF embodiment may write the address range of the data into a filter so that it is not written back to a DDR upon eviction from the LLC.

In yet another exemplary use case, a WDF embodiment may recognize that a GPU renders a larger graphic size than may be rendered on a display. Leveraging such knowledge, the WDF may filter the extra data from even being written to the LLC, thereby optimizing LLC capacity. The WDF filter may also filter the remaining graphic content from being written to DDR after being consumed by the display.

It is envisioned that in some WDF embodiments, a PCD manufacturer or user may program or modify in software certain memory address ranges to which data will be filtered from write back. Moreover, when filtering based on address ranges, it is envisioned that the WDF module may be turned off so that the dirty data (even though ephemeral) is allowed to be written back to the DDR for debugging purposes. In other embodiments, it is envisioned that data filtering may be triggered by a predetermined master component ID, for example.

Depending on embodiment, a WDF module may be positioned either upstream or downstream of the LLC component (it is envisioned that certain embodiments may include multiple WDF modules, any combination of which may include both upstream and downstream implementations).

In a post-LLC (i.e., downstream) implementation of a WDF module, the LLC may be used, for example, as a buffering component. As a nonlimiting example, consider a high resolution display that consumes a few megabytes of data being generated. The LLC, if it has the capacity, may be used as a temporal buffer for the display. Once the generated data is evicted from the LLC after being used by the display, the post-LLC WDF module may filter it from being written back to the DDR, thereby conserving bus bandwidth and power consumption.

As a nonlimiting example of a pre-LLC (i.e., upstream) implementation of a WDF module, the LLC may be accessed by multiple master components. For example, a CPU may be generating data for storage in the LLC but is suffering from being thrashed due to a relatively large amount of data being simultaneously generated by a display component. In such a scenario, a WDF module may be configured to filter the data being generated by the display from being written to the LLC, thereby mitigating the thrashing effect on the CPU and optimizing QoS.

Figure 1:
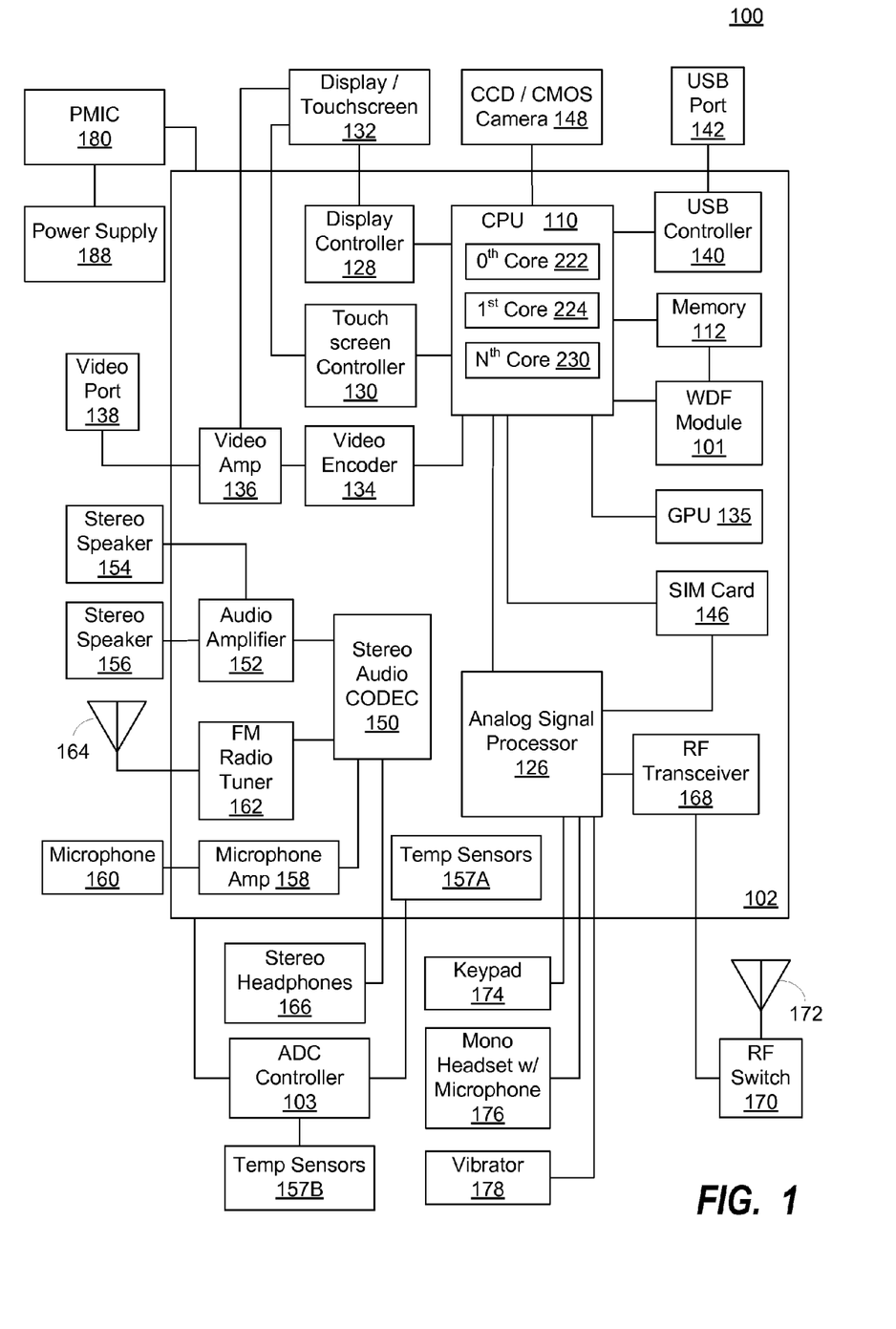
FIG. 1 is a functional block diagram illustrating an exemplary, non-limiting aspect of a portable computing device ("PCD") in the form of a wireless telephone for implementing writeback data filtering ("WDF") systems and methods.

FIG. 1 is a functional block diagram illustrating an exemplary, non-limiting aspect of a portable computing device ("PCD") in the form of a wireless telephone for implementing writeback data filtering ("WDF") systems and methods. As shown, the PCD 100 includes an on-chip system 102 that includes a multi-core central processing unit ("CPU") 110 and an analog signal processor 126 that are coupled together. The CPU 110 may comprise a zeroth core 222, a first core 224, and an Nth core 230 as understood by one of ordinary skill in the art. Further, instead of a CPU 110, a digital signal processor ("DSP") may also be employed as understood by one of ordinary skill in the art.

In general, the writeback data filter ("WDF") module 101 may be formed from hardware and/or firmware and may be responsible for filtering write requests of ephemeral data to an LLC 116 and/or from an LLC 116 to a DDR 115 (collectively depicted in FIG. 1 as memory 112). Advantageously, by recognizing ephemeral data and filtering it from write request queues, the WDF module 101 may avoid unnecessary consumption of bus bandwidth and power within the PCD that would be consumed by writeback of the ephemeral data to the DDR 115.

As illustrated in FIG. 1, a display controller 128 and a touch screen controller 130 are coupled to the digital signal processor 110. A touch screen display 132 external to the on-chip system 102 is coupled to the display controller 128 and the touch screen controller 130. PCD 100 may further include a video encoder 134, e.g., a phase-alternating line ("PAL") encoder, a sequential couleur avec memoire ("SECAM") encoder, a national television system(s) committee ("NTSC") encoder or any other type of video encoder 134. The video encoder 134 is coupled to the multi-core CPU 110. A video amplifier 136 is coupled to the video encoder 134 and the touch screen display 132. A video port 138 is coupled to the video amplifier 136.

As depicted in FIG. 1, a universal serial bus ("USB") controller 140 is coupled to the CPU 110. Also, a USB port 142 is coupled to the USB controller 140. A memory 112, which may include a PoP memory, a cache 116, a mask ROM/Boot ROM, a boot OTP memory, a DDR memory 115 (see subsequent Figures) may also be coupled to the CPU 110. A subscriber identity module ("SIM") card 146 may also be coupled to the CPU 110. Further, as shown in FIG. 1, a digital camera 148 may be coupled to the CPU 110. In an exemplary aspect, the digital camera 148 is a charge-coupled device ("CCD") camera or a complementary metal-oxide semiconductor ("CMOS") camera.

As further illustrated in FIG. 1, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 1 shows that a microphone amplifier 158 may be also coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 1 further indicates that a radio frequency ("RF") transceiver 168 may be coupled to the analog signal processor 126. An RF switch 170 may be coupled to the RF transceiver 168 and an RF antenna 172. As shown in FIG. 1, a keypad 174 may be coupled to the analog signal processor 126. Also, a mono headset with a microphone 176 may be coupled to the analog signal processor 126. Further, a vibrator device 178 may be coupled to the analog signal processor 126. FIG. 1 also shows that a power supply 188, for example a battery, is coupled to the on-chip system 102 through a power management integrated circuit ("PMIC") 180. In a particular aspect, the power supply 188 includes a rechargeable DC battery or a DC power supply that is derived from an alternating current ("AC") to DC transformer that is connected to an AC power source.

The CPU 110 may also be coupled to one or more internal, on-chip thermal sensors 157A as well as one or more external, off-chip thermal sensors 157B. The on-chip thermal sensors 157A may comprise one or more proportional to absolute temperature ("PTAT") temperature sensors that are based on vertical PNP structure and are usually dedicated to complementary metal oxide semiconductor ("CMOS") very large-scale integration ("VLSI") circuits. The off-chip thermal sensors 157B may comprise one or more thermistors. The thermal sensors 157 may produce a voltage drop that is converted to digital signals with an analog-to-digital converter ("ADC") controller (not shown). However, other types of thermal sensors 157 may be employed.

The touch screen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, thermal sensors 157B, the PMIC 180 and the power supply 188 are external to the on-chip system 102. It will be understood, however, that one or more of these devices depicted as external to the on-chip system 102 in the exemplary embodiment of a PCD 100 in FIG. 1 may reside on chip 102 in other exemplary embodiments.

In a particular aspect, one or more of the method steps described herein may be implemented by executable instructions and parameters stored in the memory 112 or as form the WDF module 101. Further, the WDF module 101, the memory 112, the instructions stored therein, or a combination thereof may serve as a means for performing one or more of the method steps described herein.

Figure 2:
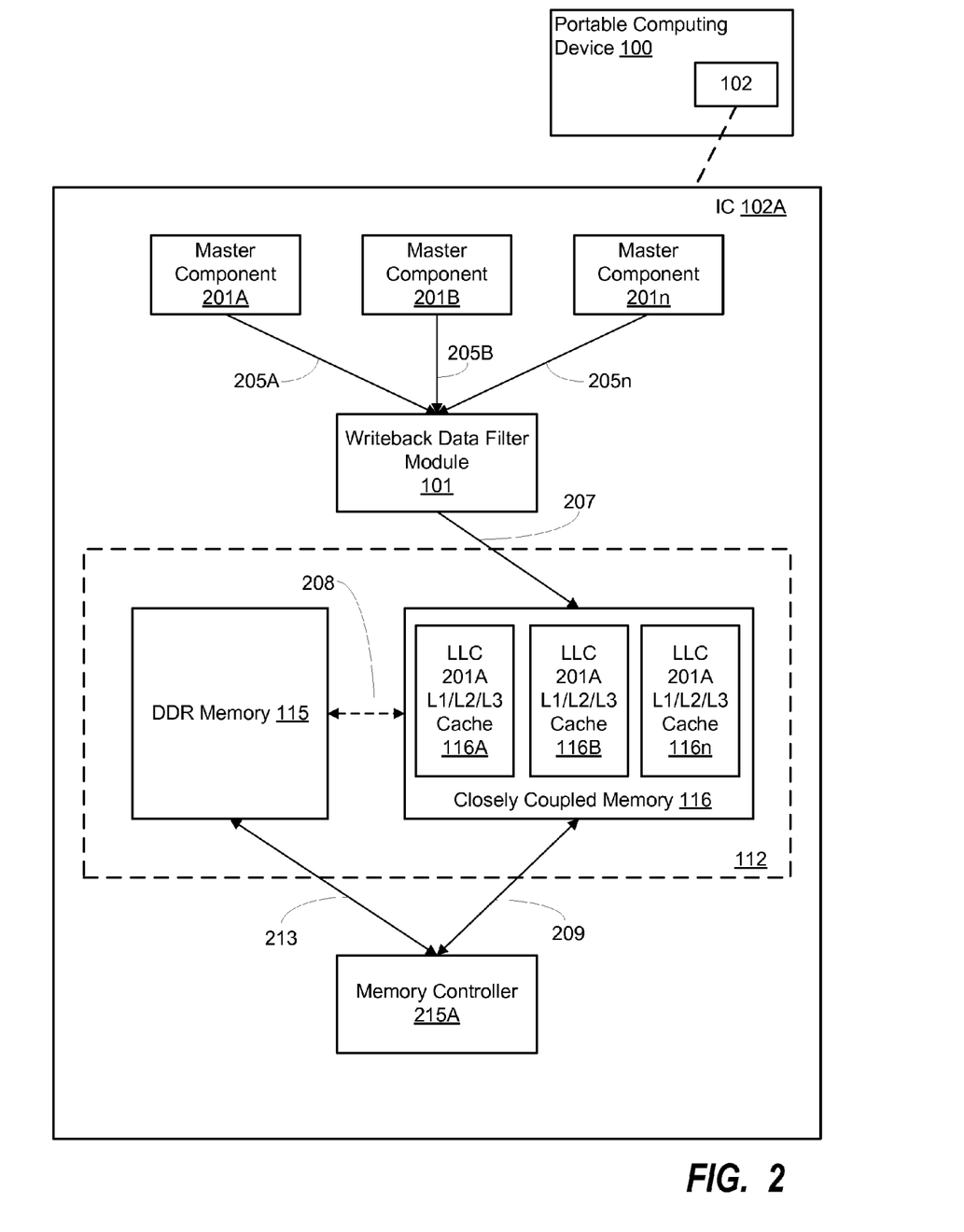
FIG. 2 is a functional block diagram illustrating an exemplary embodiment of an on-chip system for pre-cache execution of writeback data filtering ("WDF") solutions.

FIG. 2 is a functional block diagram illustrating an exemplary embodiment of an on-chip system 102A for pre-cache execution of writeback data filtering ("WDF") solutions. As indicated by the arrows 205 in the FIG. 2 illustration, a master component 201 may be submitting transaction requests for writing data to the LLC 116 via a system bus. As is understood by one of ordinary skill in the art, the data written to the LLC 116 may be ultimately recognized by a memory controller 215 and written to the DDR 115 in a write flush process to update data that are stored at address(es) of the DDR memory 115. Notably, if the transaction requests include ephemeral data, write flushing the data to the DDR 115 may be an unnecessary use of power and bandwidth in the PCD 100.

In the pre-cache WDF embodiment illustrated in FIG. 2, the WDF module 101A filters data emanating 205 from the master components 201 to identify data that is not necessary to store in the LLC 116 or write back to the DDR 115. Once identified, the WDF module 101A may clear the dirty bit associated with the ephemeral data and allow the data to be written 207 to the LLC 116. Advantageously, because the dirty bit of the ephemeral data was cleared by the WDF module 101A, the memory controller 215A will not be triggered to write the data to the DDR memory 115. The ephemeral data would remain in the LLC 116 until it is overwritten at a later time.

For data emanating 205 from the master components 201 that is not ephemeral, i.e. data that should be written back to the DDR 115, the WDF module 101A allows the data to be written 207 to the cache 116 without any modification of its associated dirty bit. Consequently, the data may be recognized 209 by the memory controller 215A and written back 213 to the DDR over a bus (represented by virtual link 208). In this way, a pre-cache WDF module 101A may conserve power and bus bandwidth in a PCD 100 by filtering ephemeral data from being written back to a DDR component 115.

An example of a use case where a pre-cache WDF embodiment may be useful for filtering ephemeral data envisions a master component in the form of a GPU 135 that renders a larger graphic size than may be rendered on a display 132. Leveraging such knowledge, the WDF module 101A may filter the extra data from even being written to the LLC 116, thereby optimizing LLC 116 capacity. The WDF module 101A may also filter the remaining graphic content by clearing its dirty bit after it is consumed by the display 132. In this way, the WDF module 101A may prevent the ephemeral data previously rendered by the display 132 from being written to DDR 115 by the memory controller 215A. The WDF module 101A may be triggered to clear the dirty bit by virtue of the data having been generated by the GPU 135 or, perhaps, by virtue of it having been consumed by the display 132 (i.e., triggered by a master component ID).

Figure 3:
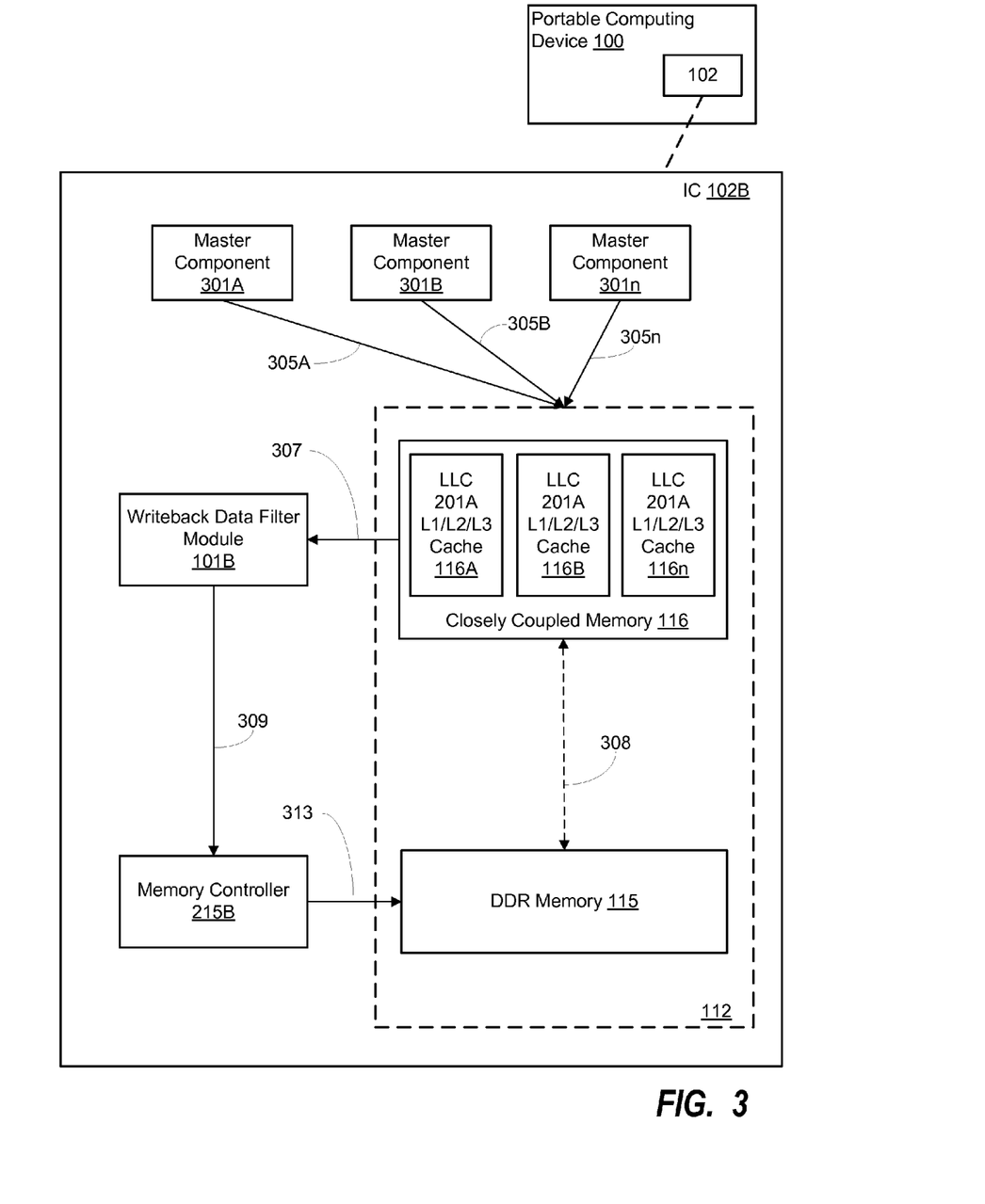
FIG. 3 is a functional block diagram illustrating an exemplary embodiment of an on-chip system for post-cache execution of writeback data filtering ("WDF") solutions.

FIG. 3 is a functional block diagram illustrating an exemplary embodiment of an on-chip system 102B for post-cache execution of writeback data filtering ("WDF") solutions. As indicated by the arrows 305 in the FIG. 3 illustration, a master component 301 may be submitting transaction requests for writing data to the LLC 116 via a system bus. As is understood by one of ordinary skill in the art, the data written to the LLC 116 may be ultimately recognized by a memory controller 215 and written to the DDR 115 in a write flush process to update data that are stored at address(es) of the DDR memory 115. Notably, if the transaction requests include ephemeral data, write flushing the data to the DDR 115 may be an unnecessary use of power and bandwidth in the PCD 100.

In the post-cache WDF embodiment illustrated in FIG. 3, the WDF module 101B filters data evicted 307 from the LLC 116 to identify data that is not necessary to write back to the DDR 115. Once identified, the WDF module 101B may drop the data transaction. Advantageously, because the ephemeral data transaction may be dropped by the WDF module 101B, the memory controller 215B will not be triggered to write the data to the DDR memory 115.

For data evicted 307 from the cache 116 that is not ephemeral, i.e. data that should be written back to the DDR 115, the WDF module 101B allows the data to pass 309 through to the memory controller 215B. Consequently, the data may be managed by the memory controller 215B and written back 313 to the DDR (represented by virtual link 308). In this way, a post-cache WDF module 101B may conserve power and bus bandwidth in a PCD 100 by filtering ephemeral data from being written back to a DDR component 115.

An example of a use case where a post-cache WDF embodiment may be useful for filtering ephemeral data envisions a rotator generating data and writing it to the LLC 116. Once a display component 301 reads the data, the data is no longer needed. Leveraging this fact, the WDF module 101B may write the address range of the data into a filter so that it is not written back to a DDR upon eviction from the LLC. In this way, the WDF module 101B may use the memory address range associated with the ephemeral data to prevent the ephemeral data previously rendered by the display 132 from being written to DDR 115 by the memory controller 215B.

Figure 4:
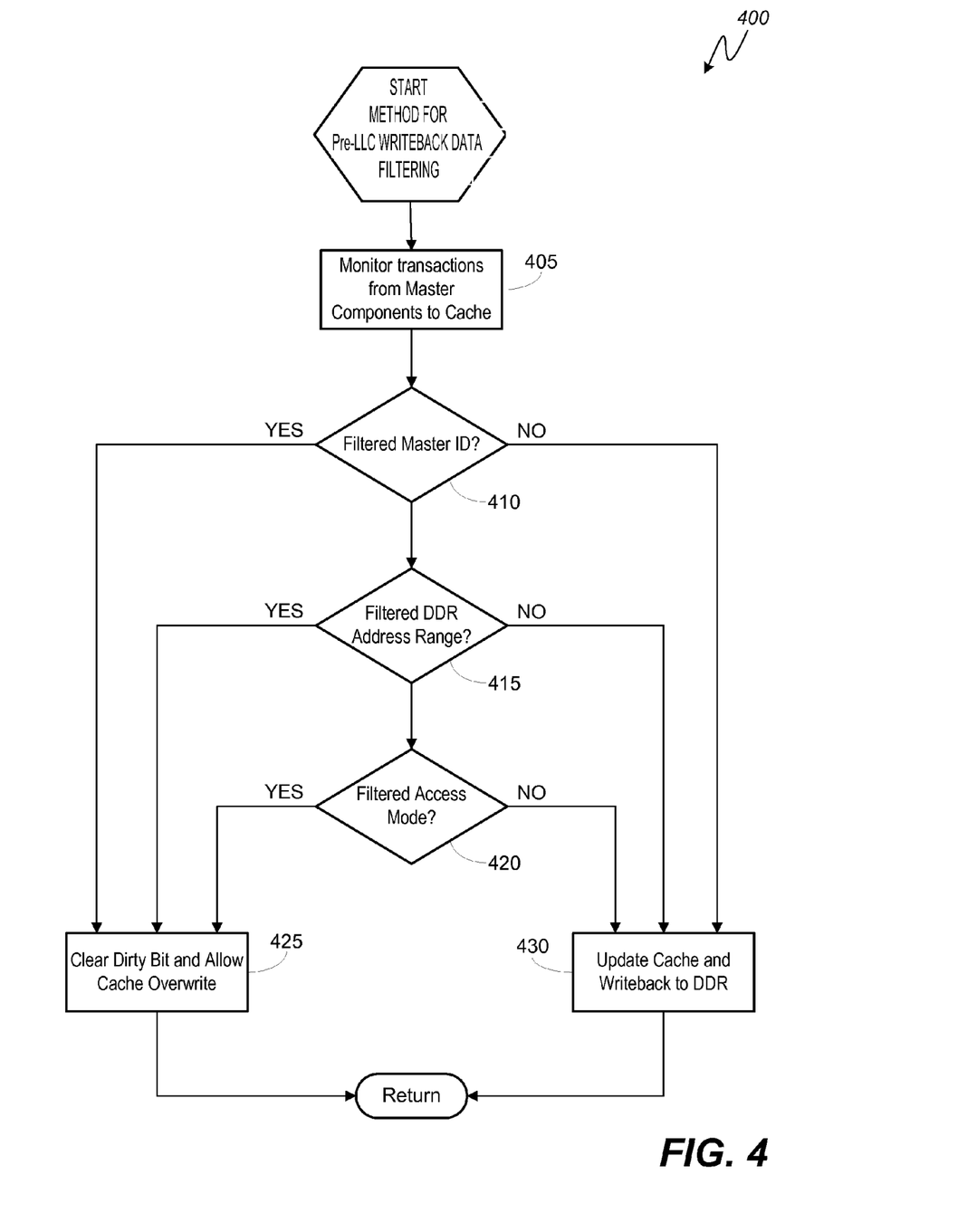
FIG. 4 is a logical flowchart illustrating an exemplary method for executing pre-cache writeback data filtering ("WDF")

FIG. 4 is a logical flowchart illustrating an exemplary method 400 for executing pre-cache writeback data filtering ("WDF"). The method 400 begins at block 405 with the WDF module 101 monitoring transactions emanating from master components 201. The WDF module 101 seeks to identify transactions associated with ephemeral data, i.e. data that is produced by a master component, stored in an LLC and consumed in a very short period of time, after which the data is no longer needed.

At decision block 410, the WDF module 101 may filter a monitored transaction based on the ID of the master component 201 that generated the data. If the particular master is recognized to generate ephemeral data, such as for example a display, the WDF module 101 may filter the data such that it will not be written back to the DDR 115. In such a case, the "yes" branch may be followed from decision block 410 to block 425. At block 425, the dirty bit associated with the ephemeral data is cleared so that the data will be overwritten in the cache 116 without ever being written back to the DDR 115. Returning to decision block 410, if the monitored data is not filtered by virtue of the master component ID, the "no" branch may be followed to block 430 and the cache is updated with the data. Notably, because the data would necessarily include a dirty bit, the memory controller 215 would eventually write the data back to the DDR 115.

At decision block 415, the WDF module 101 may filter a monitored transaction based on the DDR memory address range associated with the data. If the memory address is within a range that is associated with ephemeral data, the WDF module 101 may filter the data such that it will not be written back to the DDR 115. In such a case, the "yes" branch may be followed from decision block 415 to block 425. At block 425, the dirty bit associated with the ephemeral data is cleared so that the data will be overwritten in the cache 116 without ever being written back to the DDR 115. Returning to decision block 415, if the monitored data is not filtered by virtue of its associated address, the "no" branch may be followed to block 430 and the cache is updated with the data. Notably, because the data would necessarily include a dirty bit, the memory controller 215 would eventually write the data back to the DDR 115.

At decision block 420, the WDF module 101 may filter a monitored transaction based on the data being associated with a trusted zone or user restricted space in the memory 112. If the data is associated with a trusted zone, the WDF module 101 may filter the data such that it will not be written back to the DDR 115 where it could be accessed by unauthorized users or applications. In such a case, the "yes" branch may be followed from decision block 420 to block 425. At block 425, the dirty bit associated with the ephemeral data is cleared so that the data will be overwritten in the cache 116 without ever being written back to the DDR 115. Returning to decision block 420, if the monitored data is not filtered by virtue of being associated with a trusted zone, the "no" branch may be followed to block 430 and the cache is updated with the data. Notably, because the data would necessarily include a dirty bit, the memory controller 215 would eventually write the data back to the DDR 115. The method 400 returns.

Figure 5:
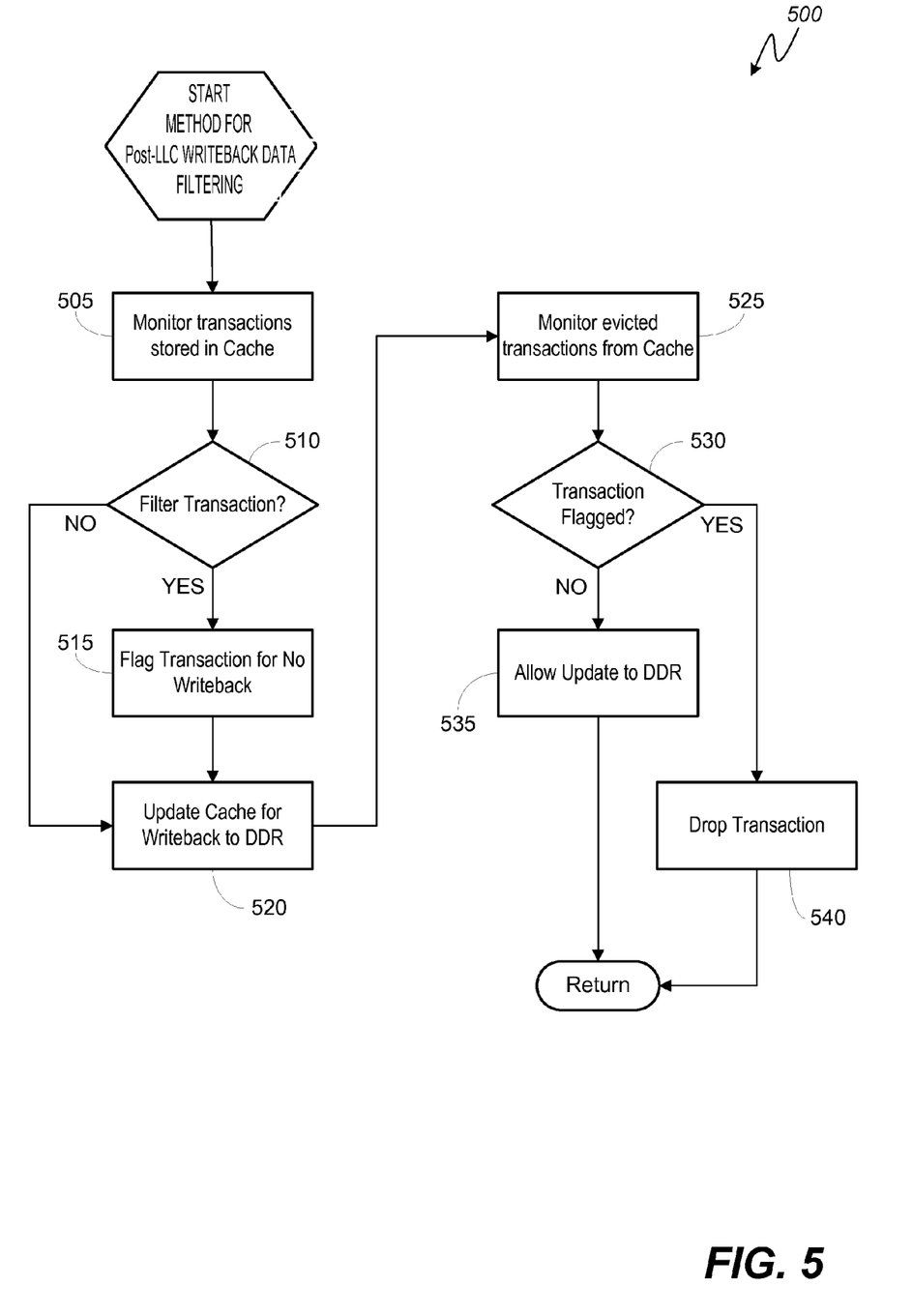
FIG. 5 is a logical flowchart illustrating an exemplary method for executing post-cache writeback data filtering ("WDF").

FIG. 5 is a logical flowchart illustrating an exemplary method 500 for executing post-cache writeback data filtering ("WDF"). The method 500 begins at block 505 with the WDF module 101 monitoring transactions being stored in the cache 116. The WDF module 101 seeks to identify transactions associated with ephemeral data, i.e. data that is produced by a master component, stored in an LLC and consumed in a very short period of time, after which the data is no longer needed.

At decision block 510, the WDF module 101 may filter transactions based on any number of factors including, but not limited to, a memory address associated with the transaction, the ID of a master component that generated the data, a trusted zone or user-restricted status associated with the data, etc. If the monitored data is identified by the WDF module 101 to be ephemeral, the "yes" branch is followed to block 515 and the transaction is flagged to not be written back to the DDR 115, otherwise the "no" branch is followed to block 520 and the transaction is allowed to be stored in the cache 116 for a later write flush to the DDR 115.

The method 500 proceeds to block 525 and transactions evicted from the cache 116 are monitored by the WDF module 101. At decision block 530, if an evicted transaction is flagged, the "yes" branch is followed to block 540 and the transaction is dropped so that the DDR 115 is not unnecessarily updated with the ephemeral data in the transaction. Otherwise, the "no" branch is followed from decision block 530 to block 535 and the memory controller 215 updates the DDR 115 with the data. The method 500 returns.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the drawings, which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Therefore, although selected aspects have been illustrated and described in detail, it will be understood that various substitutions and alterations may be made therein without departing from the spirit and scope of the present invention, as defined by the following claims.

What is claimed is:

1. A method for managing write transaction volume from a master component to a long term memory component in a system on a chip ("SoC"), the method comprising:

monitoring transactions of one or more master components, wherein the transactions are associated with a closely coupled memory component;

filtering the transactions to identify transactions with ephemeral data content, wherein filtering the transactions to identify transactions with ephemeral data content comprises filtering transactions upstream of the closely coupled memory component; and for one or more transactions identified to have ephemeral data content, blocking ephemeral data content from being written back from the closely coupled memory component to a long term memory component;

wherein blocking ephemeral data content from being written back from the closely coupled memory component to the long term memory component optimizes bandwidth utilization of a bus.

2. The method of claim 1, further comprising filtering transactions downstream of the closely coupled memory component.

3. The method of claim 2, wherein filtering the transactions downstream of the closely coupled memory component comprises filtering a transaction based on a memory address in the long term memory component associated with the filtered transaction.

4. The method of claim 2, wherein blocking ephemeral data content from being written back from the closely coupled memory component to a long term memory component comprises dropping the one or more identified transaction upon its eviction from the closely coupled memory component.

5. The method of claim 1, wherein filtering the transactions to identify transactions with ephemeral data content comprises filtering a transaction based on identification of a master component associated with the filtered transaction.

6. The method of claim 1, wherein filtering the transactions to identify transactions with ephemeral data content comprises filtering a transaction based on an access mode associated with the filtered transaction.

7. The method of claim 1, wherein blocking ephemeral data content from being written back from the closely coupled memory component to a long term memory component comprises clearing a dirty bit associated with an identified transaction.

8. The method of claim 1, wherein the long term memory component is a double data rate ("DDR") memory component.

9. The method of claim 1, wherein the closely coupled memory component is a low level cache ("LLC") that comprises one of a level one ("L1") cache, a level two ("L2") cache, and a level three ("L3") cache.

10. A system for managing write transaction volume from a master component to a long term memory component in a system on a chip ("SoC"), the system comprising:

means for monitoring transactions of one or more master components, wherein the transactions are associated with a closely coupled memory component;

means for filtering the transactions to identify transactions with ephemeral data content, wherein filtering the transactions to identify transactions with ephemeral data content comprises filtering transactions upstream of the closely coupled memory component; and for one or more transactions identified to have ephemeral data content, means for blocking ephemeral data content from being written back from the closely coupled memory component to a long term memory component;

wherein blocking ephemeral data content from being written back from the closely coupled memory component to the long term memory component optimizes bandwidth utilization of a bus.

11. The system of claim 10, further comprising means for filtering transactions downstream of the closely coupled memory component.

12. The system of claim 11, wherein the means for filtering the transactions downstream of the closely coupled memory component comprises means for filtering a transaction based on a memory address in the long term memory component associated with the filtered transaction.

13. The system of claim 11, wherein the means for blocking ephemeral data content from being written back from the closely coupled memory component to a long term memory component comprises means for dropping the one or more identified transaction upon its eviction from the closely coupled memory component.

14. The system of claim 10, wherein the means for filtering the transactions to identify transactions with ephemeral data content comprises means for filtering a transaction based on identification of a master component associated with the filtered transaction.

15. The system of claim 10, wherein the means for filtering the transactions to identify transactions with ephemeral data content comprises means for filtering a transaction based on an access mode associated with the filtered transaction.

16. The system of claim 10, wherein the means for blocking ephemeral data content from being written back from the closely coupled memory component to a long term memory component comprises means for clearing a dirty bit associated with an identified transaction.

17. The system of claim 10, wherein the long term memory component is a double data rate ("DDR") memory component.

18. The system of claim 10, wherein the closely coupled memory component is a low level cache ("LLC") that comprises one of a level one ("L1") cache, a level two ("L2") cache, and a level three ("L3") cache.

19. A system for managing write transaction volume from a master component to a long term memory component in a system on a chip ("SoC"), the system comprising:

a writeback data filter ("WDF") module configured to:
monitor transactions of one or more master components, wherein the transactions are associated with a closely coupled memory component;

filter the transactions to identify transactions with ephemeral data content, wherein filtering the transactions to identify transactions with ephemeral data content comprises filtering transactions upstream of the closely coupled memory component; and for one or more transactions identified to have ephemeral data content, block ephemeral data content from being written back from the closely coupled memory component to a long term memory component;

wherein blocking ephemeral data content from being written back from the closely coupled memory component to the long term memory component optimizes bandwidth utilization of a bus.

20. The system of claim 19, wherein the WDF module is further configured to filter transactions downstream of the closely coupled memory component.

21. The system of claim 20, wherein the WDF module is further configured to filter a transaction based on a memory address associated with the filtered transaction.

22. The system of claim 20, wherein the WDF module is further configured to drop the one or more identified transaction upon its eviction from the closely coupled memory component.

23. The system of claim 19, wherein the WDF module is further configured to filter a transaction based on identification of a master component associated with the filtered transaction.

24. The system of claim 19, wherein the WDF module is further configured to filter a transaction based on an access mode associated with the filtered transaction.

25. The system of claim 19, wherein the WDF module is further configured to clear a dirty bit associated with an identified transaction.

26. The system of claim 19, wherein the long term memory component is a double data rate ("DDR") memory component.

27. The system of claim 19, wherein the closely coupled memory component is a low level cache ("LLC") that comprises one of a level one ("L1") cache, a level two ("L2") cache, and a level three ("L3") cache.

* * * * *